United States Patent [19]

Ellis

[11] Patent Number: 4,624,212

[45] Date of Patent: Nov. 25, 1986

[54] APPARATUS COMPRISING A PERFORATED DRUM

[75] Inventor: Alfred G. Ellis, Macclesfield, United Kingdom

[73] Assignee: Imperial Chemical Industries PLC, London, England

[21] Appl. No.: 402,794

[22] Filed: Jul. 27, 1982

[30] Foreign Application Priority Data

Aug. 10, 1981 [GB] United Kingdom ................ 8124376

[51] Int. Cl.[4] .............................................. A23G 3/20

[52] U.S. Cl. ...................................... 118/19; 118/303

[58] Field of Search ................... 118/19, 20, 418, 303; 427/3; 209/398, 402

[56] References Cited

U.S. PATENT DOCUMENTS 1,381,718 6/1921 Lockard ............................ 209/398

2,946,523 7/1960 Phillips ........................... 209/398 X

*Primary Examiner*—Sam Silverberg

*Attorney, Agent, or Firm*—Cushman, Darby & Cushman

[57] ABSTRACT

A perforated drum coating machine which can readily be set up so as to be suitable for the coating of either tablets or the like, or spheroids. The machine contains at least one securing means which is attachable to the perforated drum, and at least one mesh member consisting of suitable mesh which is edged with thin springy material, and a strip of deformable rubber or plastics material which is positioned against the inward facing part of the edge of the perforated part of the drum at two or more arcuate portions thereof. The or each securing means is adapted to engage with and secure, on the inside of the drum, two mesh member edges. The total area of the mesh member(s) is essentially the same as the area of the perforated part of the drum. The deformable strips are positioned between at least two mesh member edges and the said arcuate portions of the perforated drum. The edges of the mesh member(s), which are adjacent the deformable strips which are themselves adjacent the said arcuate portions, are slightly over-long (i.e. in a circumferential sense), and they are sprung in an outward direction so as to be a tight fit against the deformable strips and, through said strips, against the arcuate edges of the perforated part of the drum.

6 Claims, 4 Drawing Figures

APPARATUS COMPRISING A PERFORATED DRUM

Figure 1:
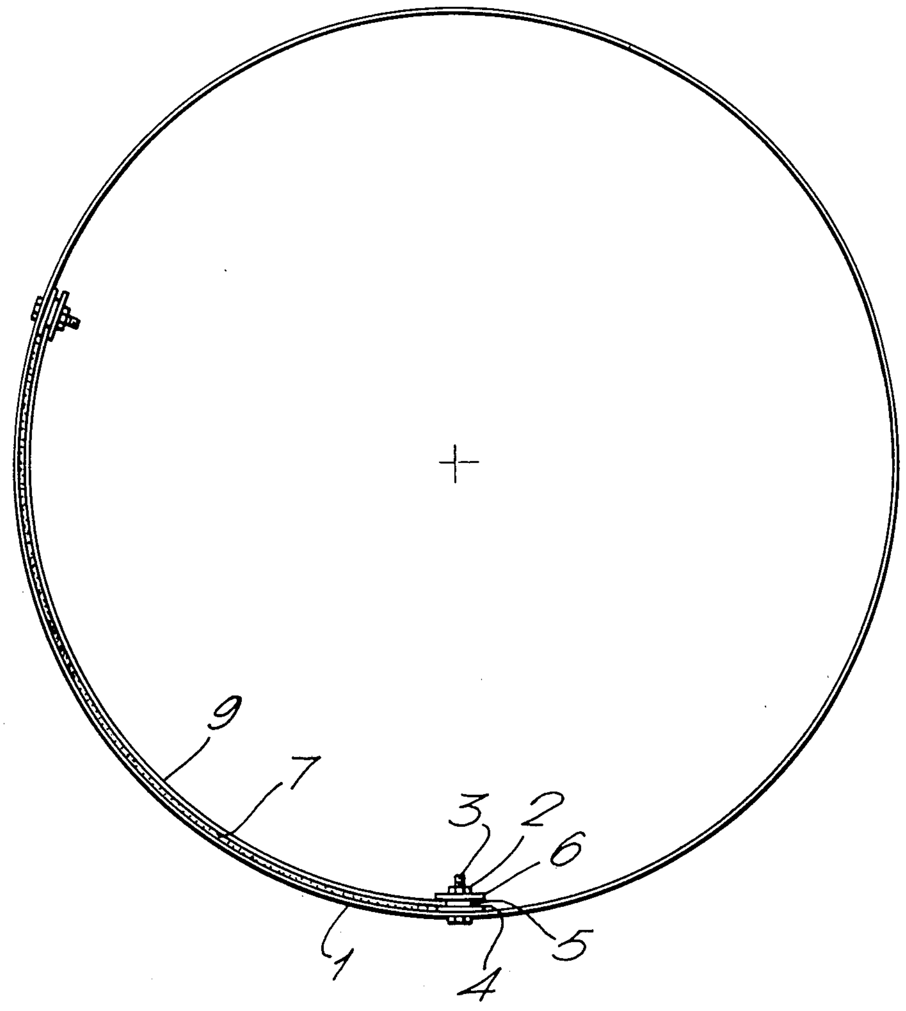

This invention relates to an apparatus and more particularly it relates to a coating machine for use in the pharmaceutical and other industries.

Perforated drum coating machines are widely used in the pharmaceutical industry for the coating of pharmaceutical formulations such as tablets with various coating materials, for example film coatings which are based on high molecular weight compounds, for example cellulose derivatives. The coating materials, solvents, and process conditions (e.g. temperature, drum rotational speed, etc.) used in such coating operations are generally known in the art. Coating machines of the type in question will be referred to in this specification as "perforated drum coating machines"; a typical example of such a machine is the 48 inch Accela-Cota (obtainable from Manesty Machines Ltd., Speke, Liverpool 24, England). As these machines are usually used in the pharmaceutical industry for coating pharmaceutical tablets or other formulations of similar dimensions, the size of the perforations in the drum is particularly chosen so as to be suitable for that task. The need has arisen more recently for a machine in which significantly smaller pharmaceutical formulations, and specifically pharmaceutical spheroids, can be coated on an industrial scale. The term "spheroid" is well known in the pharmaceutical art, and it means an essentially spherical granule, usually composed of at least one medicinal substance and at least one pharmaceutical excipient, having a diameter of 0.5 to 2 mm. Spheroids are significantly smaller than tablets and the like, and therefore the perforations in a typical perforated drum coating machine are too large to allow such machines to be used without modification to coat spheroids. Coating machines of the drum type, which are specifically designed for the coating of spheroids and like-sized bodies, are currently being developed. However, there is a need for a practical way of modifying a typical perforated drum coating machine in a reversible manner so that it is suitable for the coating of spheroids and the like. Such a modification has to satisfy various demanding requirements:

(1) the modified machine must coat the spheroids in a pharmaceutically satisfactory manner,
(2) the modified machine must not produce an unacceptably high proportion of damaged spheroids,
(3) the modified machine must not "leak" a significant amount of the spheroids,
(4) the modified machine must be structurally robust, and
(5) the modified machine must be designed in such a way that it can be changed from its original (tablet-orientated) to its modified (spheroid-orientated) form, and back again if desired, in a reasonably short length of time.

All of these requirements are met by the present invention.

According to the present invention there is provided a modified perforated drum coating machine which contains at least one securing means which is attachable to the perforated drum, and at least one mesh member consisting of suitably sized mesh, each outer edge of which is attached to a strip of thin springy material, and a strip of deformable rubber or plastics material which is positioned against the inward facing part of the edge of the perforated part of the drum at at least two arcuate portions thereof, the or each securing means being adapted to engage with and secure, on the inside of the drum, two non-adjacent mesh member edges, the edges of the mesh member or members, which edges are adjacent the said deformable strips which are themselves adjacent the said arcuate portions of the perforated drum, being slightly over-long (i.e. in a circumferential sense), and when secured in position the or each mesh member is sprung in an outward direction against the said deformable strips, and wherein the total area of the mesh member or members is essentially the same as the area of the perforated part of the drum.

In preferred embodiments of the invention the securing means and the mesh member(s) are, as far as possible, made from stainless steel, as this is particularly suitable for pharmaceutical operations. However, it is to be understood that, in part at least, alternative materials may be used. The mesh in the mesh member(s) is preferably a stainless steel mesh of appropriate wire diameter, mesh size and weave, for example a so-called Dutch weave 5 over 1 under, of stainless steel British Standard grade 304. The edging strips are preferably made of springy stainless steel, and they may be fixed to the edges of the mesh by any suitable method, for example by spotwelding. The mesh member(s) may be of any suitable shape, but an oblong shape is preferred. It will be appreciated by those skilled in the art that in any particular case the amount by which the mesh member(s) should be over-length in a circumferential sense will depend upon the other dimensions in question; this can easily be determined by simple tests. If the length is not great enough, the mesh member(s) will not remain sprung against the deformable material, and hence, through that, against the inner face of the coating drum, during the operation of the machine. Conversely, if the length is too great, it will not be physically possible to spring the mesh member(s) in an outward direction.

The deformable material may, for example, be a foam rubber strip, and it may, for example, be attached by adhesive to the adjacent inwardfacing portion of the perforated drum.

In a preferred embodiment of the invention there are three securing means, which are positioned symmetrically around the perforated drum, and three equal-sized mesh members.

In another preferred embodiment of the invention, when the deformable strips, the mesh member(s) and the securing means, are securely fixed into position, the inward facing edges of the mesh member or members are covered with a suitable metallised adhesive tape in such a way as to give a smooth surface running from the mesh, over the edge of the or each mesh member, and on to the adjacent non-perforated inner surface of the drum. This helps to reduce even further the incidence of damage by attrition to the spheroids during the coating operation. In yet a further preferred embodiment, in order to reduce wear on the said metallised tape during coating operations, any voids behind (i.e. on the outward side of) the tape are filled with suitable material, for example with self-adhesive plastics tubing.

Figure 2:
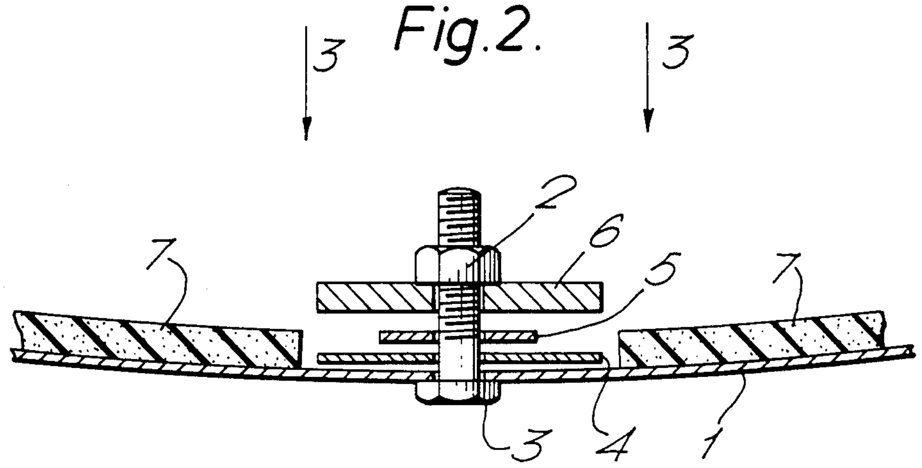
Figure 3:
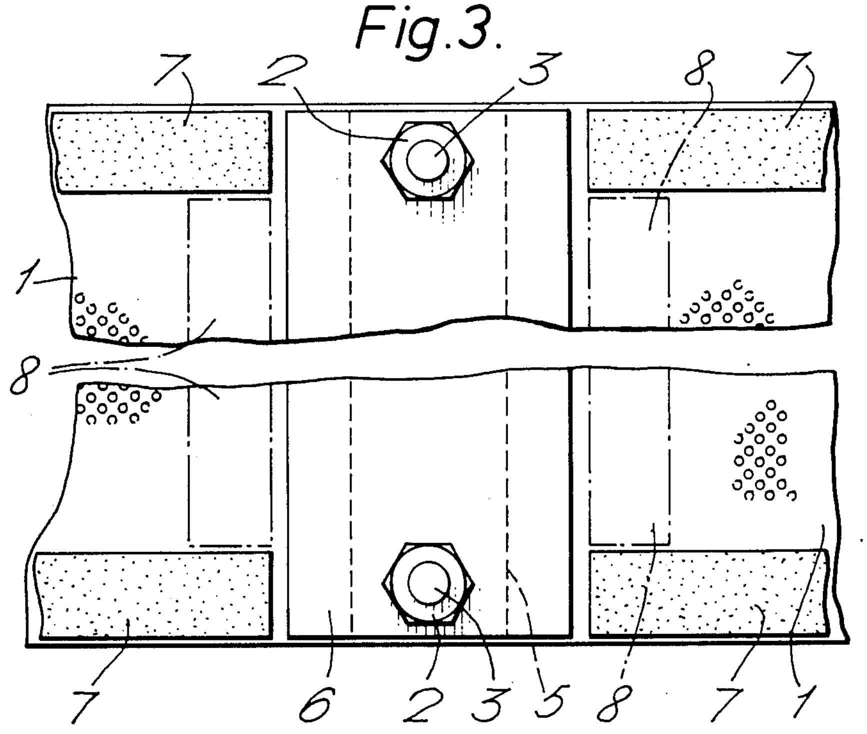
Figure 4:
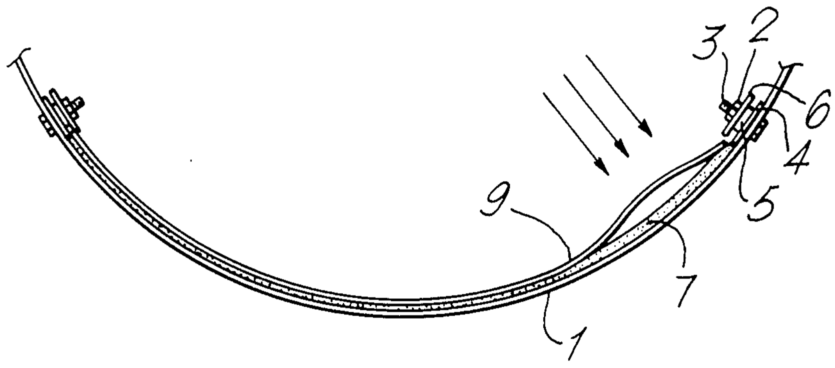
Figure 4:
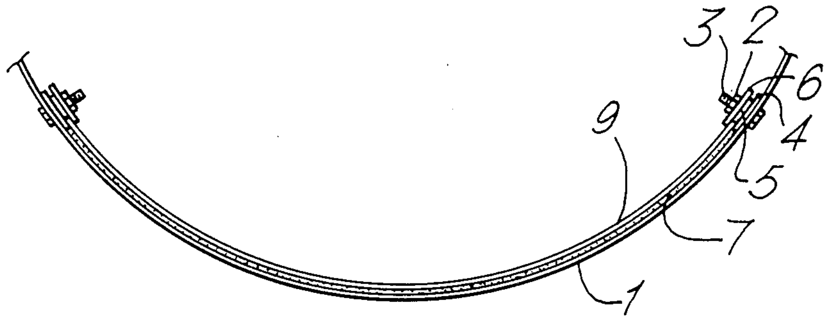

In order that the invention may be more fully understood, there will now be described, by way of example, a particular embodiment of the invention in which:

FIG. 1 is a sectional side-elevation showing the general arrangement of the parts, FIG. 2 is a section of the securing means showing also the deformable strip in position, FIG. 3 is a plan view, and FIG. 4 is schematic, and indicates the method of "springing" a mesh member.

Three securing means are attached at equidistant points to the perforated drum 1. Each securing means consists of two nuts 2 and bolts 3 which fit through suitably sized holes in the perforated drum 1. The head of each bolt 3 is cut down to approximately half the normal height to avoid fouling the drum plenum. Each bolt 3 passes through a bottom plate (thin) 4, a spacer 5, and a top plate (thick) 6, each of which extends across the width of the perforated part of the drum. A self-adhesive strip of 1" wide foam rubber strip 7 is fixed to the inner arcuate edges of the perforated part of the drum. If desired, optional cross-strips 8 of the foam rubber strip can also be fitted. The nuts 2 are tightened until they are finger-tight, and the mesh members 9 are then inserted with their edges between the plates 4 and 6. Each mesh member 9 is some 9 mm. over-length in the case of a 48" diameter perforated drum coating machine. Each mesh member 9 is then "sprung" by the application of an outward force thereto, as illustrated in FIG. 4, whereafter the nuts 2 are thoroughly tightened.

It is to be understood that variations of the embodiments described above are within the scope of the present invention. For example, instead of the deformable strip being attached to the inner surface of the perforated drum as aforesaid, it can be attached to the corresponding outward facing edges of the mesh member(s).

What we claim is:

1. A modified perforated drum coating machine which contains at least one securing means which is attachable to the perforated drum, and at least one mesh member consisting of suitably sized mesh, each outer edge of which is attached to a strip of thin springy material, and a strip of deformable rubber or plastics material which is positioned against the inward facing part of the edge of the perforated part of the drum at at least two arcuate portions thereof, the or each securing means being adapted to engage with and secure, on the inside of the drum, two non-adjacent mesh member edges, the edges of the mesh member or members, which edges are adjacent the said deformable strips which are themselves adjacent the said arcuate portions of the perforated drum, being slightly over-long and when secured in position the or each mesh member is sprung in an outward direction against the said deformable strips, and wherein the total area of the mesh member or members is essentially the same as the area of the perforated part of the drum.

2. A machine as claimed in claim 1 in which the securing means and the mesh member or members comprise stainless steel and the deformable rubber or plastics material is foam rubber strip.

3. A machine as claimed in claim 1 in which there are three securing means, positioned symmetrically around the perforated drum, and three equal-sized mesh members.

4. A machine as claimed in claim 1 in which, when the deformable strips, mesh member or members, and securing means, are securely fixed into position, the inward facing edges of the mesh member or members are covered with a suitable metallised adhesive tape in such a way as to give a smooth surface running from the mesh, over the edge of the or each mesh member, and on to the adjacent non-perforated inner surface of the drum.

5. A machine as claimed in claim 4 in which any voids on the outward side of the said metallised tape are filled with self-adhesive plastics tubing.

6. A perforated drum coating machine comprising at least two mesh member-securing means spaced circumferentially along the inside of the perforated drum, at least two mesh members of suitably sized mesh different from the perforations of the perforated drum, each outer edge of each mesh member being attached to a strip of thin springy material, each of said mesh members being secured by and between said spaced securing means on the inside of the drum and so positioned as to overlay all of the perforated area of the drum, a strip of deformable rubber or plastic material positioned between each edge of each mesh member and the inside of the perforated drum, the mesh member edges adjacent to the arcuate part of the drum being slightly overlong so that each mesh member may be slightly bowed inwardly when placed between the spaced securing means but is sufficiently springy that it may be sprung outwardly into a tightly secured position between said securing means, each mesh member when sprung outwardly into the secured position having its edges resting firmly against said deformable strips.

* * * * *